United States Patent [19]

Haury et al.

[11] Patent Number: 4,500,102

[45] Date of Patent: Feb. 19, 1985

[54] SPORTS WHEELCHAIR

[75] Inventors: Gilbert E. Haury, Grafton; Nathalal G. Patel; Walter G. Lockard, both of Elyria; Thomas R. Wiatrak, Brunswick, all of Ohio

[73] Assignee: Invacare Corporation, Elyria, Ohio

[21] Appl. No.: 442,037

[22] Filed: Nov. 16, 1982

[51] Int. Cl.[3] ................................................ B62M 1/14

[52] U.S. Cl. ............................ 280/242 WC; 297/229; 297/376; 297/437; 297/DIG. 4

[58] Field of Search ....... 280/242 WC, 287, 289 WC; 180/907; 297/DIG. 4, 437, 229, 376, 429; 403/106, 326, DIG. 6

[56] References Cited

U.S. PATENT DOCUMENTS

| | | | |
|---|---|---|---|
| 1,224,263 | 5/1917 | Bolens | 297/376 |
| 1,784,330 | 12/1930 | Bowers | 301/21 |
| 3,217,478 | 11/1965 | De Geere | 56/278 |
| 3,893,708 | 7/1975 | Moroney | 280/242 |
| 3,937,490 | 2/1976 | Nasr | 280/242 |
| 4,166,631 | 9/1979 | Sanaski | 280/242 |
| 4,231,670 | 11/1980 | Knoski | 403/11 |
| 4,351,540 | 9/1982 | Minnebraker | 280/242 |
| 4,360,213 | 11/1982 | Rudwick et al. | 280/242 WC |
| 4,405,142 | 9/1983 | Whetstine | 280/242 WC |
| 4,428,594 | 1/1984 | Minnebraker | 280/242 WC |

FOREIGN PATENT DOCUMENTS

| | | |
|---|---|---|
| 0065129 | 11/1982 | European Pat. Off. . |
| 1321402 | 6/1973 | United Kingdom . |
| 1449731 | 9/1976 | United Kingdom . |
| 2040237 | 3/1983 | United Kingdom . |

OTHER PUBLICATIONS

"The Super-Sport", Stainless Medical Products, 3107 South Kilson Drive, Santa Ana, CA.

*Primary Examiner*—Joseph F. Peters, Jr.
*Assistant Examiner*—D. Lynn Fugate
*Attorney, Agent, or Firm*—Fay & Sharpe

[57] ABSTRACT

The sports wheelchair includes a one-piece, welded tubular frame assembly (A). A pair of rear wheels (30) are horizontally and adjustably positionable in a rear wheel mounting plate (34). The mounting plate has a plurality of slots (36, 38, 40) and a plurality of alternating ridges (44) and valleys (46) which mesh with like ridges (50) and valleys (52) on an axle receiving assembly (42). A pair of front wheels (80) are mounted with a front wheel mounting assembly (82) to be selectively positioned in any one of three vertical positions (FIGS. 6, 8, and 9). The front wheels are further mountable on the inside or the outside of a lower horizontal frame portion (10) and in any one of a plurality of positions fore and aft along the horizontal frame portion. The user is supported by a fabric seat (170) which is laced to upper horizontal frame portions (12) and to a back structure (150). The back structure is connected with the frame structure by a hinge (152) such that the back is selectively foldable for easier transportation. A foot supporting structure (180) is selectively positionable in any one of a plurality of positions. A roller (202) is positioned on the foot support to inhibit the chair from tipping forward. A shield (210) inhibits the fingers of the user or others from engaging spokes of the rear wheel and causing injury.

28 Claims, 16 Drawing Figures

FIG. 8
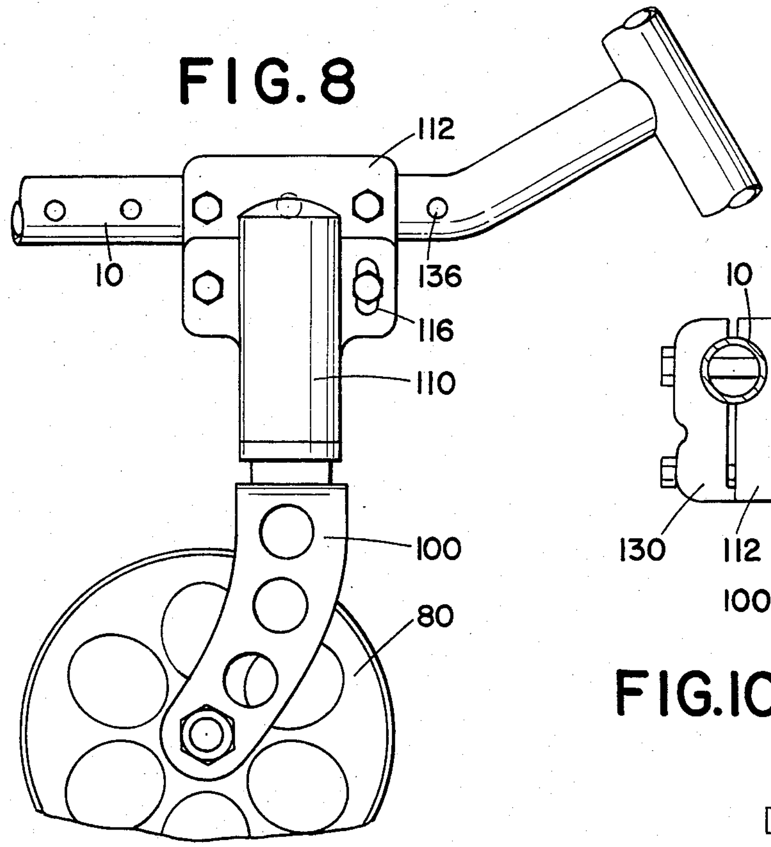
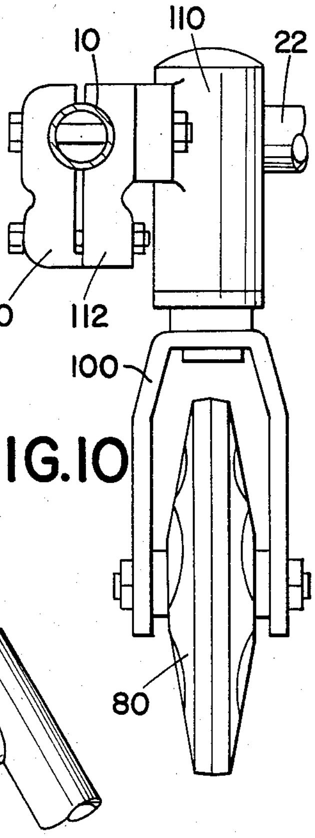
FIG. 10
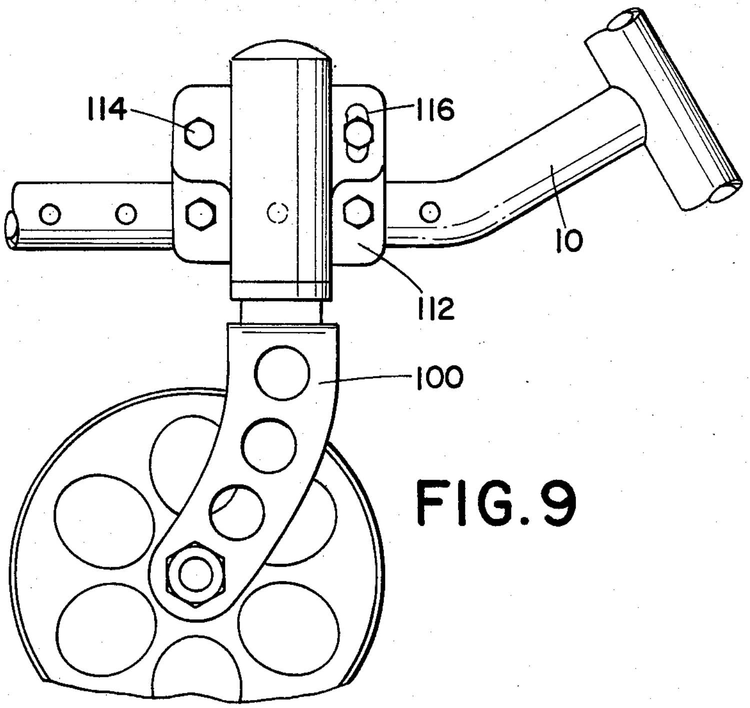
FIG. 9

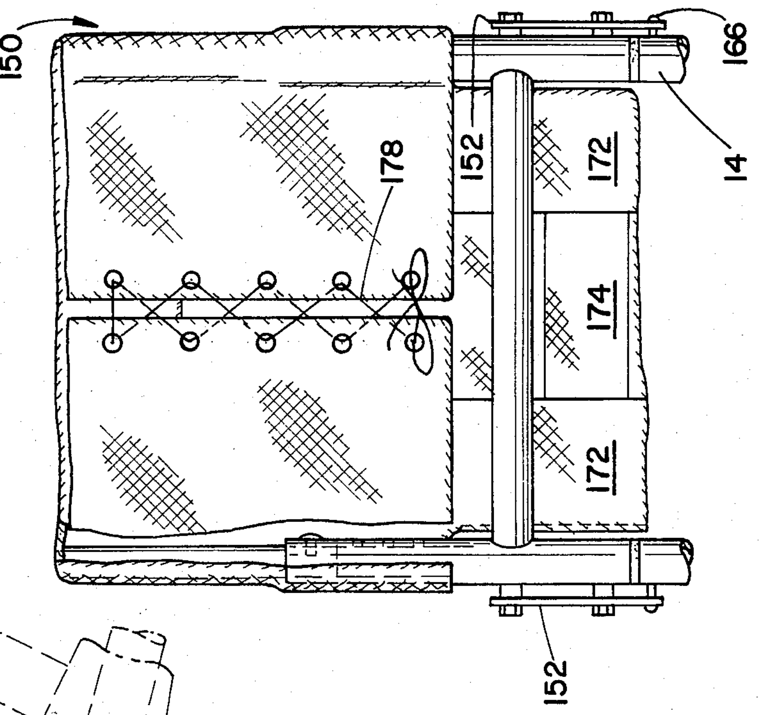
FIG. 12
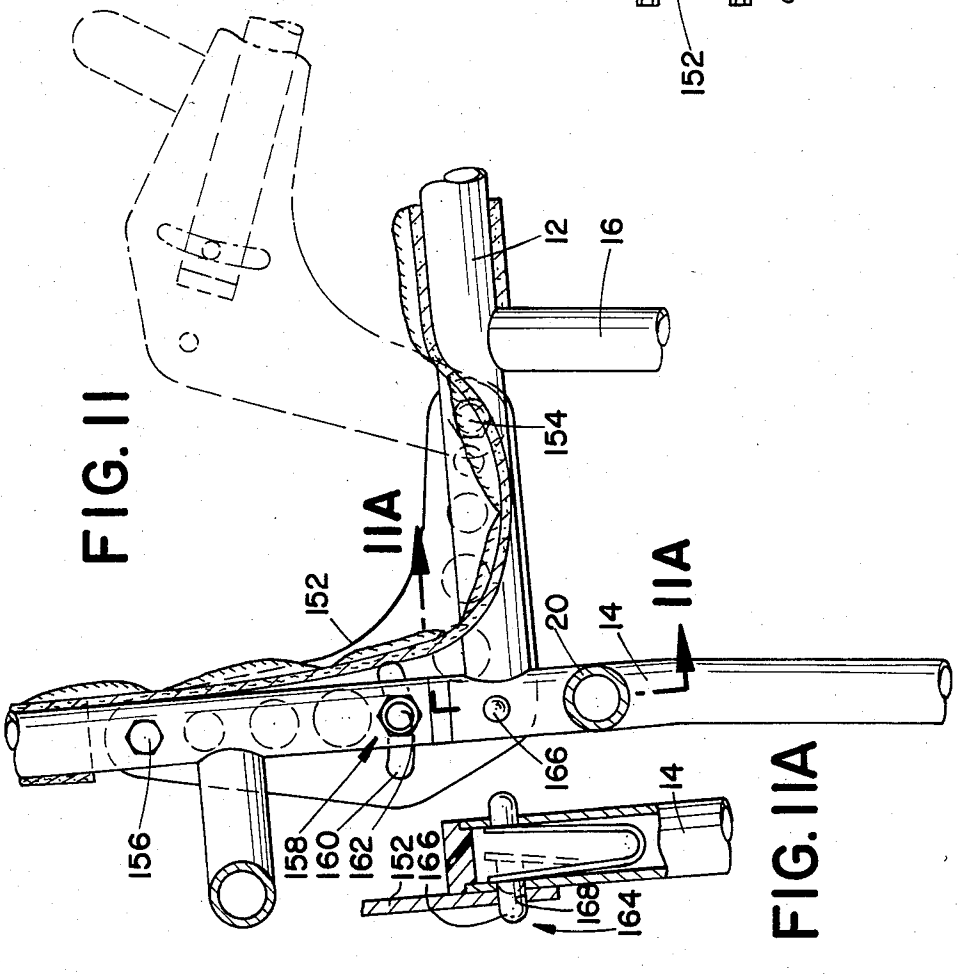
FIG. 11
FIG. 11A

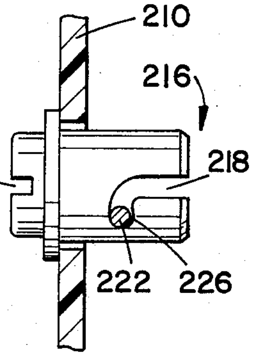
FIG. 15
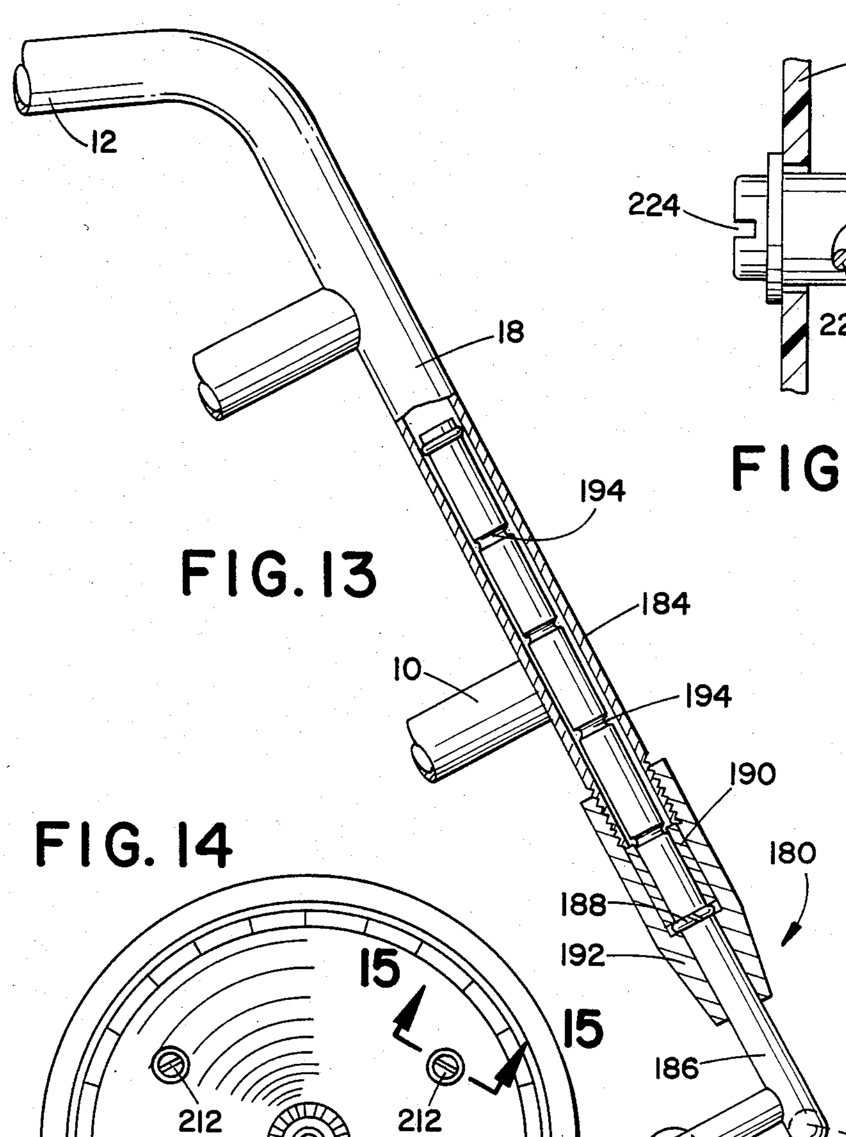
FIG. 13
FIG. 14
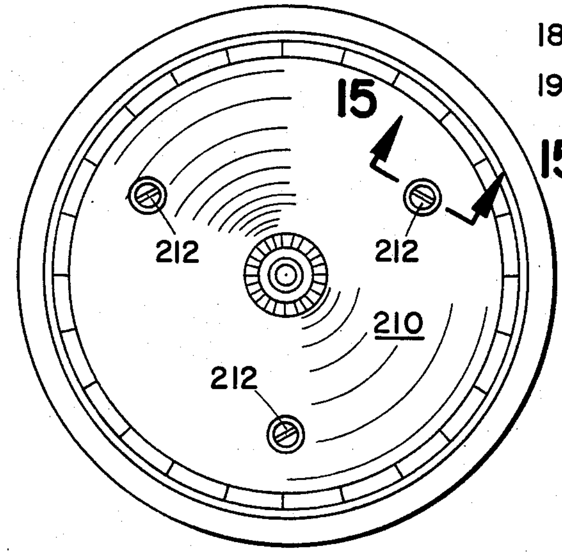

SPORTS WHEELCHAIR

BACKGROUND OF THE INVENTION

The present invention relates to personal mobility apparatus, such as wheelchairs. It finds particular application in conjunction with wheelchairs for sporting and athletic activities and will be described with particular reference thereto. It is to be appreciated, however, that the invention is applicable to daily use as well as other specialized uses.

Heretofore, wheelchairs have primarily been designed to provide transportation, often with an emphasis on user comfort, portability, and the like. Many wheelchair users demand more than mere transportation. There is a growing interest in athletic activities and sports among wheelchair users. The prior art wheelchairs tended to lack the responsiveness, maneuverability, durability, and other characteristics demanded for wheelchair sports and athletic activities.

Many of the wheelchairs being used for athletic and sporting activities are variations and adaptations of the prior art wheelchairs. Some manufacturers have adapted their existing wheelchairs for sporting use. Some wheelchair athletes have custom built their own wheelchairs for sporting and athletic activities often using parts cannibalized from the prior art wheelchairs. An exemplarly wheelchair which is used for sporting and athletic activities is illustrated in U.S. Pat. No. 4,351,540, issued September 1982 to J. P. Minnebraker. The Minnebraker wheelchair provides for vertical and fore-and-aft adjustments of the rear wheel, fore-and-aft and side-to-side adjustments of a front wheel, and for easy replacement of a user seat assembly.

Although the Minnebraker wheelchair provided for improved adjustability as demanded by the wheelchair athletes, it still had certain drawbacks. First, the rear wheel mounting assembly was relatively heavy and provided limited adjustment. Specifically, the rear wheel mounting assembly for each wheel included a pair of plates each of which were punched with discrete axle receiving apertures. The use of two plates increased the weight and the use of discrete axle receiving apertures limited adjustability. Second, the front wheel assembly was not vertically adjustable. Third, the seat assembly was relatively heavy and added weight to the chair.

The present invention contemplates a new and improved sports wheelchair which overcomes the above referenced problems and others to provide a wheelchair which is ideally suited for sports and athletic activities.

SUMMARY OF THE INVENTION

In accordance with the present invention, there is provided a sports wheelchair which is adapted for sporting and athletic activities as well as for daily use. A user supporting means is operatively connected with a wheelchair frame assembly. An adjustable rear wheel mounting means selectively mounts each of a pair of rear wheels to the frame assembly in one of a plurality of positions. An adjustable front wheel mounting means selectively mounts each of a pair of front wheels to the frame in one of a plurality of positions.

In accordance with one aspect of the invention, the front and rear wheel mounting means each provide a preselected plurality of discrete height adjustment positions.

In accordance with another aspect of the invention, the rear wheel mounting means includes a single mounting plate having a plurality of parallel axle assembly receiving slots. A plurality of alternating ridges and valleys on the plate mate with like ridges and valleys on the received axle assembly to stop the axle assembly from moving along the slots.

In accordance with another aspect of the invention, the front wheel mounting means includes a mounting bracket for mounting the front wheel assembly in a selectable one of a plurality of vertical positions, a selectable one of a plurality of fore-and-aft positions, and either on the inside or outside of the frame.

In accordance with another aspect of the invention, the user supporting means includes a seat back structure for supporting the users back. The seat back structure is pivotally connected to the frame by a hinge means and releasably locked generally in a vertical position by a locking means.

In accordance with another aspect of the invention, the user supporting means includes an adjustable leg supporting means for supporting the users legs. An externally threaded portion of the frame slidably receives a tubular portion of the leg supporting means. A retaining ring is disposed abutting the threaded frame portion and slidably receiving the leg supporting means tubular member. A locking means is threadedly received on the threaded frame portion for selectively locking the retaining ring into a nonsliding engagement with the leg supporting means tubular member to fix the leg supporting means position.

In accordance with yet another aspect of the invention, the rear wheels each include a plurality of spokes and a shield is mounted on each rear wheel for inhibiting fingers and other objects from engaging the spokes.

In accordance with yet another aspect of the present invention, each of the front wheels is relatively wide adjacent the axle to provide a large bearing surface with the axle and is relatively narrow around its circumference to minimize the area of engagement, hence minimize the friction, between the wheel and the floor or other supporting surface. Each front wheel has a plurality of alternating, radially extending relatively thick and thin regions to support the circumference portion with the minimal wheel weight.

In accordance with still another aspect of the present invention, the frame assembly is constructed of welded titanium tubes.

A primary advantage of the present invention is that it facilitates custom adjustment to the user's specifications.

Another advantage of the present invention is that it is light weight for responsive handling, yet strong and durable to withstand the abuse of rugged athletic contests.

Still further advantages of the present invention will become apparent to others upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it.

FIG. 8 is a side view of the front wheel mounting assembly analogous to FIG. 6 but with the front wheel mounted to elevate the front of the wheelchair;

FIG. 9 is a side view of the front wheel mounting assembly analogous to FIG. 6 with the front wheel mounted to lower the front end of the wheelchair;

FIG. 10 illustrates the front wheel mounting assembly of FIG. 6 mounted to the inside of the frame;

FIG. 11 is an enlarged sectional view illustrating a back supporting structure and hinge;

FIG. 11A is an enlarged sectional view through section 11A—11A illustrating an assembly for locking the back supporting structure generally vertically;

FIG. 12 is a rear view of the back supporting structure;

FIG. 13 is an enlarged side view in partial section of a leg rest adjustment assembly;

FIG. 14 is a side view of a spoke rear wheel with a spoke guarding shield mounted thereto; and, FIG. 15 is a sectional view through section 15—15 illustrating a clip for connecting the shield to the spokes of the rear wheel.

DETAILED DESCRIPTION OF THE PREFERRED EMBODIMENT

Figure 1:
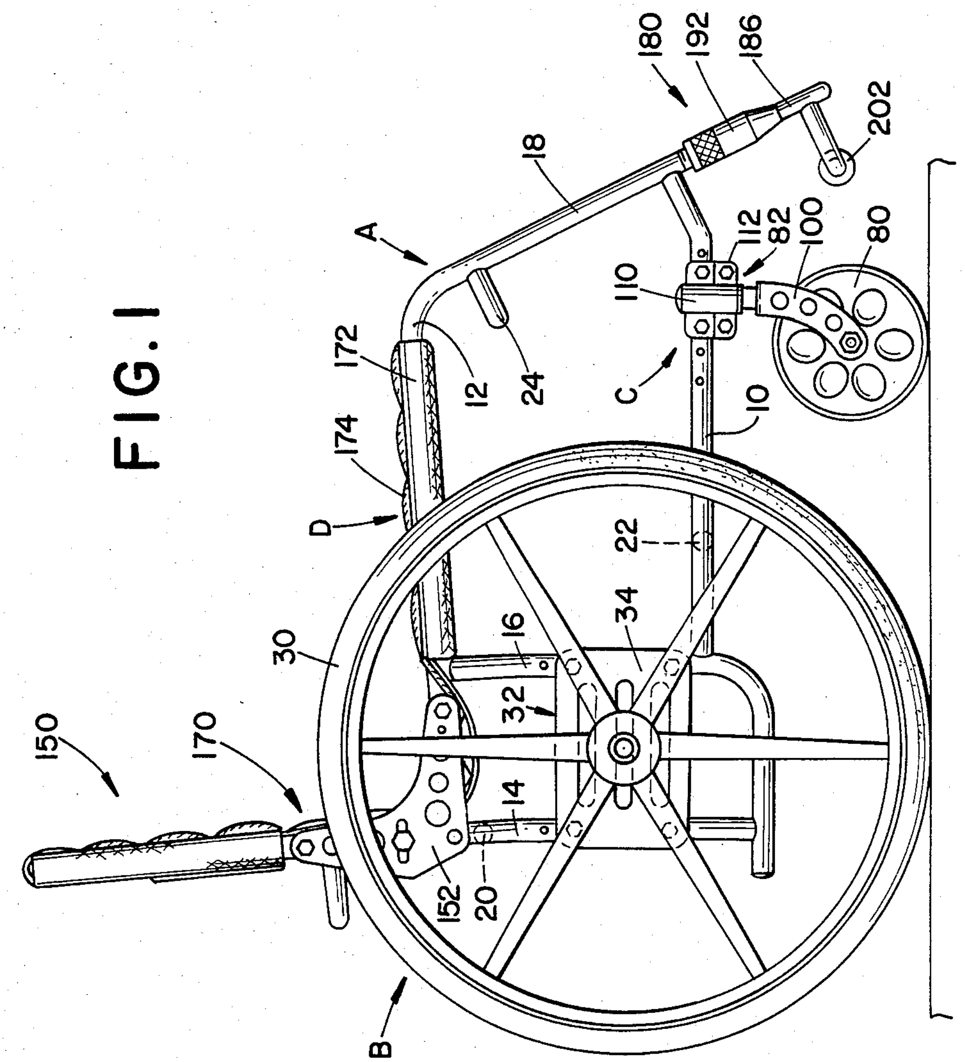
FIG. 1 is a side view of a sports wheelchair in accordance with the present invention.
Figure 2:
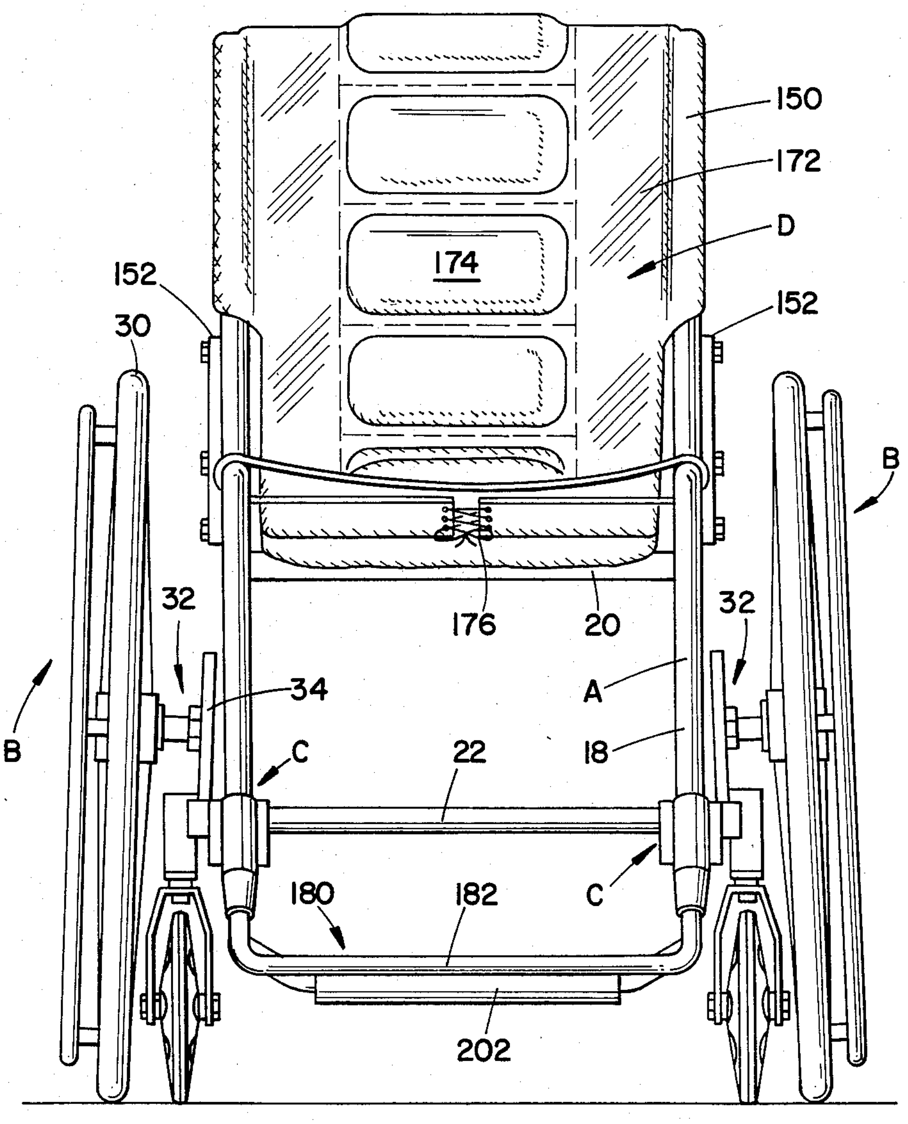
FIG. 2 is a front view of the wheelchair of FIG. 1.

With reference to FIGS. 1 and 2, the sports wheelchair includes a frame assembly A. The wheelchair is movably supported on the ground or other support surface by an adjustable rear wheel assembly B and an adjustable front wheel assembly C. A user supporting means D is operatively connected with the frame assembly A for supporting the user during athletic competitions and the like.

It is to be appreciated that the wheelchair is symmetric to the left and right of a central axis. For simplicity of illustration, like parts of the left and right sides of the central axis will be denoted by the same reference numeral.

With continued reference to FIGS. 1 and 2, the frame assembly A includes parallel lower horizontal frame portions 10 and upper horizontal frame portions 12. A pair of rear vertical supporting frame portions 14 and 16 and a forward leg support frame portion 18 connect the upper and lower horizontal frame portions at the rear and front, respectively. A plurality of transverse frame members 20, 22, and 24, extend between the left and right frame portions for greater strength and stability. The frame tubing may be stainless steel, aluminum, titanium, or the like. Titanium and titanium alloys are preferred for their light weight and great strength.

Figure 4:
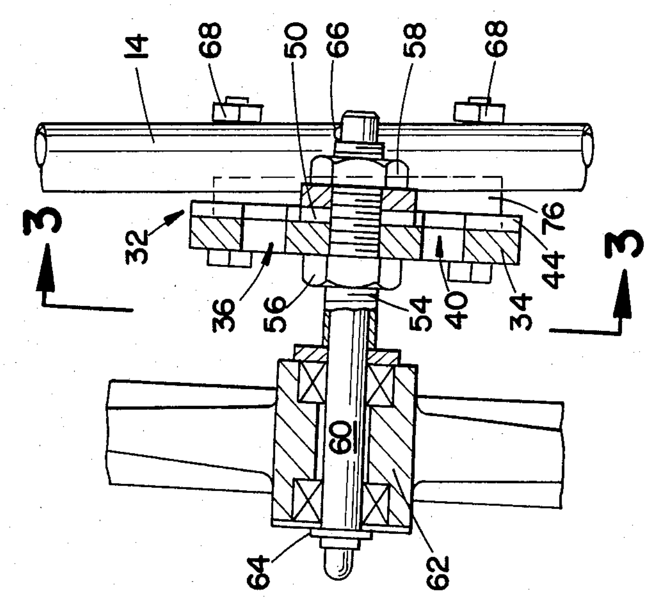
FIG. 4 is a sectional view through section 4—4 of FIG. 3.
Figure 5:
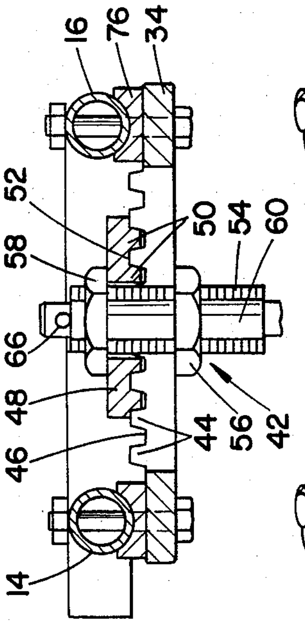
FIG. 5 is a sectional view through section 5—5 of FIG. 3.
Figure 3:
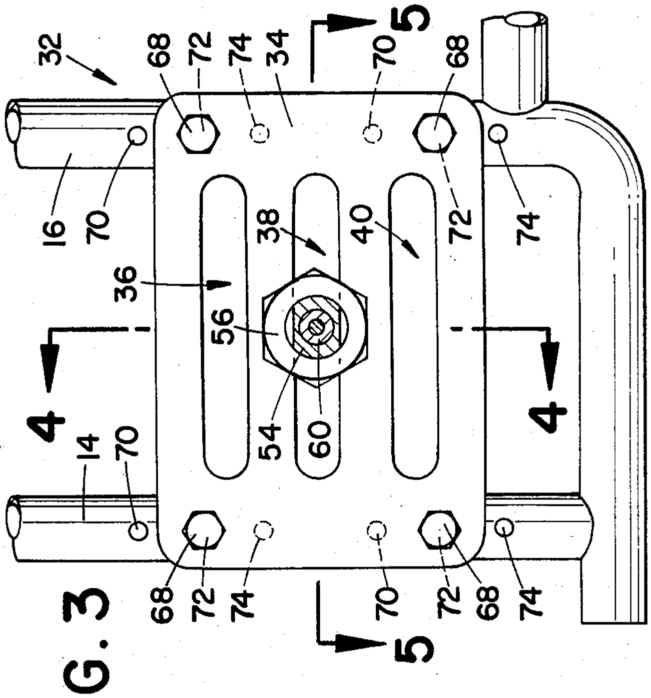
FIG. 3 is an enlarged side view of a rear wheel mounting assembly of FIG. 1.

With continuing reference to FIGS. 1 and 2, and particular reference to FIGS. 3, 4, and 5, the rear wheel assembly B includes a pair of rear wheels 30 which are connected to the frame with adjustable rear wheel mounting means 32. Each of the rear wheel mounting means 32 includes a mounting plate 34 which has a plurality of horizontal slots which extend on parallel slot axes 36, 38, and 40. In the preferred embodiment, the mounting plate includes three slots. An axle receiving assembly 42 is selectively positionable in the slots at a selectable position along each slot. A stop means is provided for stopping movement of the axle receiving assembly along the slot in which it is mounted. In the preferred embodiment, the stop means includes a first or plate stop means which includes a plurality of alternating ridges 44 and valleys 46 extending transverse to the parallel slot axes. The axle receiving assembly 42 includes a second stop means 48 which has like ridges 50 and valleys 52, for selectively engaging the plate ridges and valleys. In the preferred embodiment, the plate including the ridges and valleys is a one piece aluminum extrusion which is cut to length (height) and which has the slots cut therein.

The axle receiving assembly 42 further includes an externally threaded element 54 which is dimensioned for receipt in the mounting plate slots and for sliding receipt of the second means 48. First and second internally threaded members or nuts 56 and 58 are threadedly receiving on externally threaded member 54 on opposite sides of the mounting plate to mount it rigidly thereto. The nuts 56 and 58 hold the ridges and valleys of the first and second stop means in meshing engagement. The externally threaded member 54 further includes an internal bore for selectively receiving a releasable axle 60. In the preferred embodiment, the axle extends through a hub 62 of the rear wheel and through the externally threaded member. The axle includes a permanent projection 64 at one end and a selectively retractable projection 66 at the other end for releasably locking the axle through the hub and bore, hence for releasably securing the rear wheel.

The mounting plate 34 has a plurality of apertures for receiving a plurality of fasteners 68 therethrough. The rear vertical frame members 14 and 16 each include a plurality of sets of aperture 70, 72, and 74 such that the mounting plate is selectively mountable in any one of a corresponding plurality of positions. In this manner, the height of the interconnection between the rear axle and the chair is primarily adjustable by selecting one of the plurality of horizontal slots and is secondarily adjustable by selecting the set of apertures in which the mounting plate is fastened. In this manner, a discrete but closely spaced plurality of vertical rear wheel height adjustments are provided. Optionally, a pair of canting elements 76 may be received between the mounting plate and the vertical frame member such that the mounting plate 34, hence the axle receiving assembly 42 and rear wheel 30, are canted. Alternately, the mounting plate may alternately be positioned with the slots vertically and the alternating ridges and valleys horizontally.

Figure 6:
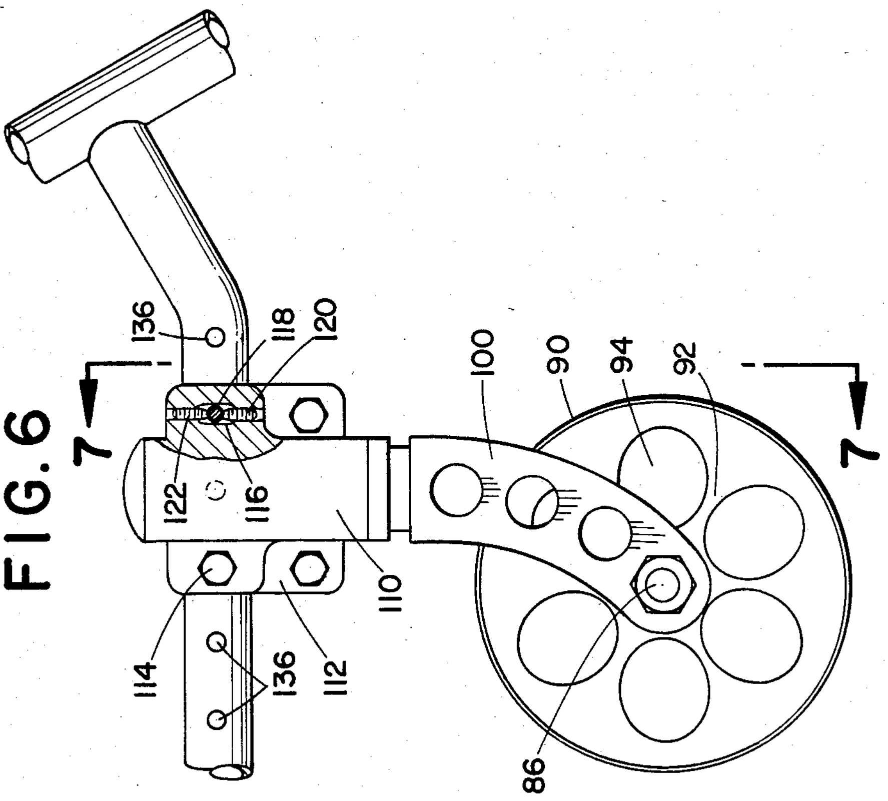
FIG. 6 is an enlarged view in partial section of a front wheel mounting assembly of FIG. 1.

With continued reference to FIGS. 1 and 2, and particular reference to FIGS. 6–10, the front wheel assembly C includes a pair of front wheels 80 and adjustable front wheel mounting means 82 for selectively mounting each of the front wheels to the frame assembly in one of a plurality of positions. With particular reference to FIGS. 5 and 6, each front wheel 80 includes a relatively wide, central portion 84 adjacent an axle 86 for providing a relatively long surface for supporting a bearing means 88. In this manner, the wheel is inhibited from wobbling on the axle. Adjacent a circumferential edge 90, the wheel is relatively narrow to minimize the area which engages the ground or other supporting surface which, in turn, minimizes friction. Between the central and circumferential regions, the front wheels have radially extending alternating wide portions 92 and narrow or scopped out portions 94. This provides strength to support the circumferential portion yet reduces weight.

Figure 7:
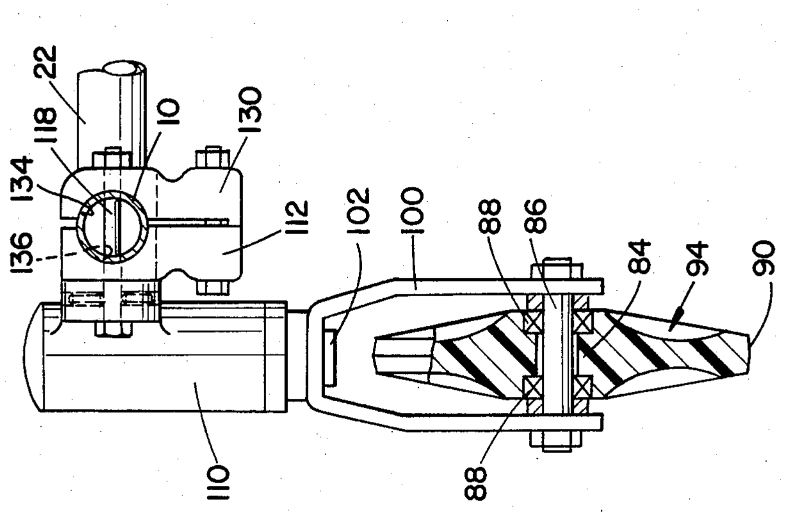
FIG. 7 is a sectional view through section 7—7 of FIG. 6.

With continuing reference to FIGS. 6 and 7, the front wheel mounting means 82 a wheel supporting assembly or fork 100 which mounts the axle 86 at one end and has a vertical, cylindrical shaft 102 at its upper end. A wheel fork mounting bracket 110 rotatably receives the cylindrical shaft 102 in a generally vertical orientation so that the front wheel may rotate freely. The bracket 110 is mounted to a mounting block 112 by a first pivot means 114, such as a fastener and aperture, and an arcuate slot 116 and fastener 118. The arcuate slot 116 permits the bracket to be pivoted about the first pivot means 114 such that the cylindrical shaft 102 is vertically disposed regardless of the angle of attack of the wheelchair. An angular adjustment locking means is selectively positionable in the arcuate slot to lock the bracket 110 from pivoting about the pivot means 114. In the preferred embodiment, the locking means includes a first threaded element 120 and a second threaded element 122 which are threadedly disposed through the bracket for selectively foreshortening the effective length of the arcuate slot. Specifically the threaded elements engage the fastener 118.

In the preferred embodiment, the mounting block 112 and a second mounting block 130 are mounted on the lower horizontal frame portion 10. Each of the mounting blocks has a recess, 132 and 134 respectively, for receiving and frictionally engaging the lower horizontal frame portion 10. Each mounting block has a first pair of apertures and a second pair of apertures. Both pair of apertures have the same horizontal spacing as the pivot means 114 and arcuate slot 116. In this manner, the bracket 110 is thus adapted to be mounted to the mounting blocks through either the first or second pair of apertures. Thus, the bracket is adapted to be mounted in either of two discrete vertical positions as typified by FIGS. 6 and 8.

With particular reference to FIG. 9, the mounting blocks 112 and 130 are adapted to be mounted on the lower horizontal frame portion 10 with the recesses 132 and 134 either at the lower end or at the upper end. In this manner, the first and second bracket portions can be reversed about the horizontal axis such that the second aperture pair is disposed above the lower horizontal frame portion. This provides a third height adjustment position for the bracket 110.

With reference to FIG. 10, the bracket 110 is further adapted to be mounted on either the inside or the outside of the lower horizontal frame portion 10. In this manner, the swivel structure is adapted to be mounted in six positions. Further, the lower horizontal frame portion has a plurality of pairs of apertures, such as apertures 136 for selective alignment with the mounting block apertures. This enables the mounting blocks, hence the brackets 110 to be selectively positioned at a plurality of forward and aft positions along the lower horizontal frame portion.

With continued reference to FIGS. 1 and 2 and further reference to FIGS. 11 and 12, the user supporting means D includes a back structure 150 for engaging and supporting the user's back. A hinge means 152 pivotally mount the back structure to the frame A, specifically the upper horizontal frame portions 12. The hinge means each include a frame pivot means 154 such as a fastener which passes through an aperture in the hinge means, a nylon bushing, and into the upper horizontal frame portion. The back structure is connected with the hinge means by a first connection means 156 and an adjustable connection means 158. In the preferred embodiment, the adjustment means includes an arcuate slot 160 which receives a threaded fastener 162. The fastener 162 selectively clamps against the hinge means to clamp the back in a selected angular orientation for user comfort.

With particular reference to FIG. 11A, a back structure locking means 164 selectively locks the back structure in a generally vertical orientation. The locking means includes a detent 166 which is selectively received in a hinge means aperture 168. By manually depressing the detent, the back structure is released for movement to a folded or horizontal orientation, shown in phantom for easier handling.

With reference to FIGS. 1, 2, 11, and 12, the user supporting means D further includes a flexible cloth seat 170 including side portions 172 and a segmented central portion 174. Adjacent the front end, the flexible seat wraps around the upper horizontal frame portions 12 and is laced with laces 176 securely thereto (FIG. 2). At a rear end, the flexible seat is wrapped around the back structure 150 and laced thereto with laces 178. Adjacent the intersection of the back structure and the upper horizontal frame portion, the seat 170 is not directly supported such that it sags. By adjusting the interconnection of the flexible seat with the back and upper horizontal frame portions, the degree of sag is selectively adjustable to adjust the contour of the seat for user comfort. In the preferred embodiment, the flexible seat is folded over the back structure and by folding over additional or fewer of the central segments 174, the degree of sag is discretely adjustable. In the preferred embodiment, the flexible seat is constructed of cloth with cushion filled pockets. Preferrably, the side and central seat portions are in the team colors.

With continuing reference to FIGS. 1 and 2, and particular reference to FIG. 13, the user supporting means 12 further includes a foot or leg supporting means 180. The foot supporting means is adjustably connected with the frame such that a horizontal foot supporting bar 182 is positionable an adjustable distance from the seat 170. An externally threaded sleeve portion 184 is integrally connected with the front frame portion 18. A tubular member 186 integrally connected with the foot supporting bar is slidably received in the threaded sleeve. A split retaining ring 188 is disposed to abut the threaded sleeve portion 184 and slidably receive the tubular member 186. More specifically, the retaining ring abuts a collar or spacer 190 which, in turn, abuts the threaded sleeve. A clamping or camming means 192 is threadedly received and the threaded sleeve 184 for selectively camming the retaining ring 188 into nonsliding engagement with the tubular member 186. More specifically, the tubular member includes a plurality of annular recesses 194 into which the split retaining ring is resiliently received. The camming means includes a cam surface 196 which clamps or cams the retaining ring 188 into the collar 190 with sufficient force to prevent the retaining ring from expanding sufficiently for the retaining ring to leave an associated recess 194. In this manner, the footrest is selectively positionable in one of a plurality of discrete positions. Optionally, the camming means may cam the retaining ring 188 into tight frictional engagement with the tubular member 186 to lock it into any one of a continuum of positions.

The foot supporting means 180 includes a second horizontal support bar 200 on which a bumper 202 is mounted. Preferably, the bumper is an elongated roller mounted for rotation about a horizontal axis. Alternately, the bumper may be an elongated sleeve of tough polymeric material. If the wheelchair is impacted from the rear with sufficient force to tip forward, the roller engages the floor or other supporting surface to limit the chair from tipping forward.

With particular reference to FIGS. 14 and 15, a shield 210 is provided for inhibiting objects such as fingers from engaging spokes of the rear wheels. In the embodiment of FIGS. 14 and 15, the shield includes an annular disc which is mounted to the spokes by a plurality of clips 212. With particular reference to FIG. 15, each of the clips has an enlarged portion for rotatably engaging the shield and a bayonet-type connector portion 216 for extending through the shield and engaging the spokes. Specifically, the bayonet-type connector portion has a pair of generally L-shaped slots 218 which have sufficient width to receive a spoke 222. A spoke is received through an axial portion of the longitudinal slot and the clip is turned by a rotating means such as a screwdriver receiving slot 224 to position the spoke in the horizontal portion of the L-shaped slot. Preferrably, the horizontal portion of the L-shaped slot is an axial projection 226 in which the spoke is received to inhibit the clip from rotating under normal vibration and movement.

The invention has been described with reference to the preferred embodiment. Obviously, modifications and alterations will occur to others upon reading and understand the preceding detailed description of the preferred embodiments. It is intended that the invention be construed as including all such alterations and modifications insofar as they come within the scope of the appended claims or the equivalents thereof.

Having thus described the preferred embodiment, the invention is now claimed to be:

1. A wheelchair which is adapted for both sporting activities and daily use, the wheelchair comprising:
- a frame assembly;
- supporting means for supporting a user, the supporting means being operatively connected with the frame assembly;
- a pair of rear wheels;
- an adjustable rear wheel mounting means for selectively mounting each of the rear wheels to the frame assembly in one of a plurality of positions, the rear wheel mounting means being operatively connected with the frame assembly, the rear wheel mounting means including:
  - a mounting plate including a plurality of slots which are elongated along parallel slot axes;
  - an axle receiving assembly which is selectively positionable in the slots at a selectable position along the slot axis;
  - a stop means for stopping the axle receiving assembly from shifting along the slot axis;
- a pair of front wheels; and,
- a front wheel mounting means for mounting each of the front wheels to the frame assembly.

2. The wheelchair as set forth in claim 1 wherein the stop means includes a plurality of selectively mating projections and recesses on the mounting plate and axle receiving assembly.

3. The wheelchair as set forth in claim 1 wherein the stop means includes a plurality of alternating ridges and valleys disposed on the mounting plate substantially perpendicular to the slot axes.

4. The wheelchair as set forth in claim 3 wherein the mounting plate with the ridges and valleys is a one-piece extrusion into which the slots are cut.

5. The wheelchair as set forth in claim 1 wherein the user supporting means includes a back structure for engaging and supporting the user's back, the back structure being pivotally mounted to the frame by a hinge means.

6. The wheelchair as set forth in claim 5 further including locking means for releasably locking the back structure in a generally vertical position.

7. The wheelchair as set forth in claim 6 wherein the user supporting means further includes a flexible seat which is wrapped in part around first and second upper, generally horizontal frame portions and in part around the back structure.

8. The wheelchair as set forth in claim 7 wherein the hinge means is connected with the back structure by a first fastener extending through a hinge means aperture into the back structure and a second fastener extending through a hinge means arcuate slot into the back structure, whereby the angular orientation of the back structure is selectively adjustable by loosening the second fastener, adjusting the relative position of the fastener and tightening the second fastener into frictional engagement with the hinge means.

9. The wheelchair as set forth in claim 7 wherein the flexible seat is unconnected with the frame assembly adjacent the back structure such that the seat is adapted to sag adjacent the back structure and wherein the flexible seat is adjustably connected with the back structure for selectively adjusting the degree of sag, whereby the contour of the seat is adjustable for user comfort.

10. The wheelchair as set forth in claim 1 the frame assembly is constructed of a plurality of welded titanium tubing lengths.

11. The wheelchair as set forth in claim 10 wherein the axle receiving assembly includes:
- an externally threaded member having an exterior dimension which is commensurate with a transverse dimension of the slots for receipt therein and an internal bore which is dimensioned to receive an axle therethrough;
- a first internally threaded retaining means threadedly received on the externally threaded member on one side of the mounting plate;
- a second internally threaded retaining means threadedly received on the externally threaded member on the other side of the mounting plate such that the first and second retaining means retain the externally threaded member in a received slot; and,
- the axle receiving means ridges and valley being disposed on an element which is received on the externally threaded member between one of the retaining means and the mounting plate ridges and valleys such that movement of the externally threaded member along the received slot is stopped.

12. The wheelchair as set forth in claim 10 wherein the frame assembly and the mounting plate have a plurality of selectively alignable mounting apertures and further including canting means selectively disposable between the mounting plate and the frame for canting the angle of the rear wheels and a plurality of fasteners for extending through the mounting apertures for fastening the mounting plate to the frame assembly.

13. A wheelchair which is adapted for both sporting activities and daily use, the wheelchair comprising:
- a frame assembly;
- supporting means for supporting a user, the supporting means being operatively connected with the frame assembly;
- a pair of rear wheels;
- a rear wheel mounting means for selectively mounting each of the rear wheels to the frame assembly, the rear wheel mounting means being operatively connected with the frame assembly;
- a pair of front wheels;
- a pair of wheel fork assemblies each of which terminates at an upper end in a cylindrical shaft, one of the front wheels being rotatably mounted in each wheel fork assembly;
- a pair of wheel fork brackets each rotatably receiving one of the wheel fork assembly cylindrical shafts; and,
- a pair of mounting blocks each mounting one of the wheel fork brackets on the frame assembly in a selectively adjustable one of a plurality of vertical positions, each with the cylindrical shaft disposed generally vertically.

14. The wheelchair as set forth in claim 13 further including angular adjustment means for selectively adjusting the angular orientation of the cylindrical shaft.

15. The wheelchair as set forth in claim 14 wherein the mounting block includes a plurality of bracket mounting means each disposed at a discrete vertical position, such that the vertical position of the bracket is selectively adjustable to a plurality of discrete vertical positions.

16. The wheelchair as set forth in claim 15 wherein the mounting block is connected with a horizontal frame portion reversibly about a horizontal axis such that the swivel structure mounting means is selectively positonable at least in part in a first position at least partially above the horizontal frame portion and in a second position at least partially below the horizontal frame portion.

17. The wheelchair as set forth in claim 16 wherein the mounting block includes a recess for at least partially receiving the horizontal frame portion, at least a first aperture pair extending through the frame portion receiving recess, and at least a second aperture pair vertically displaced from the first aperture pair;
- and further including a second block having a recess for at least partially receiving the horizontal frame portion, a first aperture pair extending through the frame portion receiving recess, and a second aperture pair vertically displaced from the first aperture pair;
- the horizontal frame portion having a plurality of apertures disposed for selective alignment with the first and second mounting block first aperture pairs, such that the first and second mounting blocks are adapted to be mounted along the horizontal frame portion by fasteners in any one of a plurality locations; and,
- the bracket having at least one aperture pair disposed for selectively alignment with the first and second mounting block first and second aperture pairs such that the bracket is adapted to be mounted to the mounting blocks by fasteners in any one of a plurality of positions.

18. A wheelchair which is adapted for both sporting activities and daily use, the wheelchair comprising:
- a frame assembly;
- supporting means for supporting a user, the supporting means being operatively connected with the frame assembly;
- a pair of rear wheels;
- a rear wheel mounting means for selectively mounting each of the rear wheels to the frame assembly, the rear wheel mounting means being operatively connected with the frame assembly;
- a pair of front wheels; and,
- a pair of adjustable front wheel mounting means for selectively mounting each of the front wheels to the frame assembly with a selectable angle of attack, each front wheel mounting means including:
  - a mounting block operatively connected with the frame assembly;
  - a wheel fork bracket for rotatably receiving a wheel fork assembly for rotation about a generally vertical axis of rotation;
  - a pivot means for connecting the wheel fork bracket and the mounting block such that pivotal movement of the wheel fork assembly axis of rotation is selectively permitted;
  - a fastener and arcuate slot for connecting the wheel fork bracket and mounting block for limiting pivotal movement about the pivot means; and,
  - angular adjustment locking means for selective disposition in the arcuate slot to foreshorten its effective length and limit relative pivotal movement between the wheel fork bracket and the mounting block.

19. The wheelchair as set forth in claim 18 wherein the angular adjustment locking means includes first and second threaded elements disposed for threaded advancement generally axially along the arcuate slot from generally opposite ends to foreshorten the effective slot length, whereby the first and second threaded elements are adapted to lock a selected angular adjustment of the cylindrical shaft.

20. The wheelchair as set forth in claim 18 wherein:
- each front wheel is mounted on an axle by bearing means;
- the front wheel is relatively wide in a central portion around the axle to provide an axially elongated axle receiving bore to inhibit the wheel from wobbling on the axle;
- each front wheel is relatively narrow around its circumference to minimize the area which engages a supporting surface to minimize friction between the wheel and supporting surface; and,
- each front wheel having a plurality of alternating relatively thick and thin regions extending radially between the central and circumferential wheel portions to support the circumferential portion with reduced weight.

21. A wheelchair which is adapted for both sporting activities and daily use, the wheelchair comprising:
- a frame assembly;
- supporting means for supporting a user, the supporting means being operatively connected with the frame assembly;
- a pair of rear wheels;
- a rear wheel mounting means for selectively mounting each of the rear wheels to the frame assembly, the rear wheel mounting means being operatively connected with the frame assembly;
- a pair of front wheels;

a front wheel mounting means for selectively mounting each of the front wheels to the frame assembly;

foot supporting means for supporting an operator's feet; and, means for adjustably connecting the foot supporting means with the frame assembly, the adjustable foot support connecting means including:

a threaded sleeve portion operatively connected with one of the frame assembly and foot supporting means;

a tubular member slidably received in the threaded sleeve, the tubular member being operatively connected with the other of the frame assembly and foot supporting means, a retaining ring disposed to abut the threaded sleeve portion and slidably receive the tubular member; and, camming means threadedly received on the threaded sleeve for selectively camming the retaining ring into nonsliding receipt with the tubular member to fix the foot supporting means position.

22. The wheelchair as set forth in claim 21 wherein the retaining ring is a split ring, the tubular member has a plurality of depressions for receiving the split ring, and the camming means selectively cams the split ring against the threaded sleeve portion with sufficient force to prevent the split ring from being released from a selected depression whereby discrete adjustments for the leg supporting means are provided.

23. A wheelchair which is adapted for both sporting activities and daily use, the wheelchair comprising:

a frame assembly;

supporting means for supporting an operator, the supporting means being operatively connected with the frame assembly;

a pair of rear wheels, each rear wheel including:

a plurality of wire spokes;

a pair of spoke shields for inhibiting objects from engaging the rear wheel spokes;

a plurality of spoke clips for selectively attaching the spoke shields to the rear wheel spokes, each spoke clip including means for rotatably engaging the shield and a bayonet-type connector portion for selective connection with a spoke such that the clip is moved axially to receive a spoke and rotated to lock the spoke in the bayonet-type connector portion, spring tension between the shield and spoke acting to hold the clip and spoke locked;

rear wheel mounting means for selectively mounting each of the rear wheels to the frame assembly, the rear wheel mounting means being operatively connected with the frame assembly;

a pair of front wheels; and, a front wheel mounting means for selectively mounting each of the front wheels to the frame assembly.

24. A wheelchair which is adapted for both sporting activities and daily use, the wheelchair comprising:

a frame assembly;

supporting means for supporting an operator, the supporting means being operatively connected with the frame assembly, the supporting means including a back structure for engaging and supporting the operator's back;

a pair of hinge plates for interconnecting the back structure and the frame assembly such that the back structure is adapted to be positioned in a generally vertical back supporting position and folded against the frame assembly in a folded position to lower the profile of the wheelchair;

an adjustable connection means for interconnecting the back structure and the hinge plates such that the angular position of the back structure in the back supporting position is selectively adjustable;

a back structure locking means operatively connected with the hinge plates and one of the frame assembly and the back structure for selectively locking the back structure in the back supporting position and selectively unlocking the back structure to pivot to the folded position generally against the frame assembly;

a pair of rear wheels;

a rear wheel mounting means for selectively mounting each of the rear wheels to the frame assembly, the rear wheel mounting means being operatively connected with the frame assembly;

a pair of front wheels; and, a front wheel mounting means for selectively mounting each of the front wheels to the frame assembly.

25. The wheelchair as set forth in claim 24 wherein the back structure locking means includes a spring biased detent which is biased into a locking relationship with one of the hinge plates, the detent being selectively retractable against the spring biasing to unlock the back structure to pivot to the folded position.

26. A wheelchair which is adapted for both sporting activities and daily use, the wheelchair comprising:

a frame assembly including first and second upper, generally horizontal frame portions;

supporting means for supporting an operator, the supporting means including:

a back structure for engaging and supporting the operator's back, the back structure operatively connected with the frame assembly;

a flexible seat wrapped in part around a forward portion of the first and second upper frame portions and selectively interconnected with itself and wrapped in part around the back structure such that the flexible seat is selectively removable, the flexible seat being unconnected with a rearward portion of the first and second upper frame portions adjacent the back structure such that the flexible seat sags adjacent the back structure to support and conform to the operator;

a pair of rear wheels;

a rear wheel mounting means for selectively mounting each of the rear wheels to the frame assembly, the rear wheel mounting means being operatively connected with the frame assembly;

a pair of front wheels; and, a front wheel mounting means for selectively mounting each of the front wheels to the frame assembly.

27. A wheelchair which is adapted for both sporting activities and daily use, the wheelchair comprising:

a frame assembly including generally horizontal lower frame members;

supporting means for supporting an operator, the supporting means being operatively connected with the frame assembly;

a pair of rear wheels;

a rear wheel mounting means for selectively mounting each of the rear wheels to the frame assembly, the rear wheel mounting means being operatively connected with the frame assembly;

a pair of front wheels; and, a pair of adjustable front wheel mounting means for selectively mounting each of the front wheels to the frame assembly with a selectable angle of attack, each front wheel mounting means including:

a wheel fork assembly for rotatably receiving one of the front wheels;

a mounting block selectively connected with one of the horizontal lower frame members for being selectively positioned at a plurality of positions therealong;

a wheel fork bracket for rotatably receiving the wheel fork assembly for rotation about a fork rotation axis;

a means for selectively connecting the wheel fork bracket and the mounting block selectively at a plurality of relative angular orientations such that the wheel fork bracket is selectively pivoted relative to the mounting block, whereby the angle of attack of the wheel fork assembly is selectively adjustable.

28. A wheelchair which is adapted for both sporting activities and daily use, the wheelchair comprising:

a frame assembly;

supporting means for supporting a user, the supporting means being operatively connected with the frame assembly;

a pair of rear wheels;

an adjustable rear wheel mounting means for selectively mounting each of the rear wheels to the frame assembly in one of a plurality of positions, the rear wheel mounting means including:

a mounting plate operatively connected with the frame assembly, the mounting plate defining at least one slot extending along a slot axis and a plurality of alternating ridges and valleys extending generally transverse to the slot axis;

an axle receiving assembly which is selectively positionable in the slots at a selectable position along the slot axis, the axle receiving assembly including:

a plurality of alternating ridges and valleys which are dimensioned for meshing engagement with the mounting plate ridges and valleys, such that the interaction of the mounting plate and axle receiving assembly ridges and valleys stops the axle receiving assembly from shifting along the slot axis;

a pair of front wheels; and, a front wheel mounting means for selectively mounting each of the front wheels to the frame assembly.

* * * * *